(12) United States Patent
Shikagawa

(10) Patent No.: US 10,574,857 B2
(45) Date of Patent: Feb. 25, 2020

(54) IMAGE PROCESSING DEVICE CONFIGURED TO MAKE SHADING CORRECTION, NON-TRANSITORY COMPUTER-READABLE COMPUTER MEDIUM STORING IMAGE PROCESSING PROGRAM FOR SHADING CORRECTION, AND METHOD OF GENERATING READOUT DATA USING SHADING CORRECTION

(71) Applicant: SEIKO EPSON CORPORATION, Tokyo (JP)

(72) Inventor: Yuichi Shikagawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/285,797

(22) Filed: Feb. 26, 2019

(65) Prior Publication Data

US 2019/0268497 A1    Aug. 29, 2019

(30) Foreign Application Priority Data

Feb. 27, 2018 (JP) ................................. 2018-032909

(51) Int. Cl.
| | |
|---|---|
| *H04N 1/401* | (2006.01) |
| *H04N 1/407* | (2006.01) |
| *H04N 1/40* | (2006.01) |
| *H04N 1/409* | (2006.01) |
| *H04N 1/00* | (2006.01) |
| *H04N 1/60* | (2006.01) |

(52) U.S. Cl.
CPC ......... *H04N 1/401* (2013.01); *H04N 1/00013* (2013.01); *H04N 1/00034* (2013.01); *H04N 1/00068* (2013.01); *H04N 1/00082* (2013.01); *H04N 1/409* (2013.01); *H04N 1/4076* (2013.01); *H04N 2201/044* (2013.01)

(58) Field of Classification Search
CPC .............................................. H04N 1/407–409
See application file for complete search history.

(56) References Cited

U.S. PATENT DOCUMENTS

| | | | |
|---|---|---|---|
| 8,373,900 B2 * | 2/2013 | Morikawa ............ | H04N 1/4092 358/1.8 |
| 9,930,213 B2 * | 3/2018 | Fusayasu ........... | H04N 1/00018 |
| 9,992,375 B2 * | 6/2018 | Matsubara ......... | H04N 1/40006 |

FOREIGN PATENT DOCUMENTS

JP     2009-225309 A     10/2009

* cited by examiner

*Primary Examiner* — Scott A Rogers
(74) *Attorney, Agent, or Firm* — Foley & Lardner LLP

(57) ABSTRACT

An image processing device includes: a sensor that reads a print region and a non-print region of a print medium, an image being printed in the print region, the non-print region being a blank area; and a controller that makes shading correction for an output from the sensor, based on a read result from the sensor. The controller sets a patch image printed in the print region to a black reference, sets the non-print region to a white reference, and makes the shading correction, based on properties of the black reference and the white reference at individual locations.

20 Claims, 10 Drawing Sheets

NON-PRINT REGION

NON-PRINT REGION

PRINT REGION

PRINT REGION

IMAGE PROCESSING DEVICE CONFIGURED TO MAKE SHADING CORRECTION, NON-TRANSITORY COMPUTER-READABLE COMPUTER MEDIUM STORING IMAGE PROCESSING PROGRAM FOR SHADING CORRECTION, AND METHOD OF GENERATING READOUT DATA USING SHADING CORRECTION

BACKGROUND

1. Technical Field

The present invention relates to an image processing device, a non-transitory computer-readable computer medium storing an image processing program, and a method of generating readout data.

2. Related Art

Shading correction is a known technique for improving the quality of images, in which a sensing range of a sensor is specified based on a black reference and a white reference. An example of the related art is disclosed in JP-A-2009-225309. The disclosed system makes the shading correction by setting readouts of a sheet to white reference values and readouts of a maximum density pattern to black reference values.

The shading correction described above is based on the precondition that the black reference values are equated with one another. However, if the black reference is a patch image with a relatively large area, the property of the light reflected on the black reference may vary with a location of a sensor. As a result, the shading correction might contain location-dependent errors.

SUMMARY

An advantage of some aspects of the invention is to provide a mechanism for making shading correction with great precision.

According to an aspect of the invention, an image processing device includes a sensor and a controller. The sensor reads a print region and a non-print region of a print medium; an image is printed in the print region, and the non-print region is a blank area. The controller makes shading correction for an output from the sensor, based on a read result from the sensor. The controller sets a patch image printed in the print region to a black reference, sets the non-print region to a white reference, and makes the shading correction, based on properties of the black and white references at individual locations.

The above configuration, even if the results of reading the patch image being set as a black reference differ from one another at individual locations, can make the shading correction to absorb this difference. Consequently, it is possible to make the shading correction with great precision.

It is preferable that the sensor be mounted in a carriage that reciprocates at a predetermined, fixed distance from the print medium. Furthermore, it is preferable that the controller move the carriage in a prescribed direction and make the shading correction, based on the properties of the black and white references at individual locations in one or both of the prescribed direction in which the carriage moves and a direction perpendicular to the prescribed direction.

The above configuration can make the shading correction to absorb a difference among the read results in one or both of the prescribed direction in which the carriage moves and the direction perpendicular to the prescribed direction.

It is preferable that the carriage include a print section through the image processing device prints the image in the print region. Furthermore, it is preferable that the controller make the shading correction, based on an output that the sensor generates by reading an adjustment pattern printed by the print section, and correct the image to be printed by the print section, based on an output for which the shading correction has been made.

The above configuration can identify a factor of degrading a print quality in the print section, based on the result of reading the adjustment pattern with the sensor and can print the image with the degradation factor eliminated or reduced. In addition, the sensor can read the patch image without being greatly influenced by the location dependence of the patch image, because the output that the sensor generates by reading the adjustment pattern has been subjected to the shading correction. Consequently, it is possible to precisely identify degradation of the print quality in the print section and correct the degradation.

It is preferable that the adjustment pattern include a plurality of adjustment patterns. Furthermore, it is preferable that the controller cause the print section to print the plurality of adjustment patterns at different densities, make the shading correction for outputs that sensor generates by reading the plurality of adjustment patterns, and cause the print section to print the image that has been corrected in accordance with the densities of the adjustment patterns and based on the outputs for which the shading correction has been made.

The above configuration can make the correction by using a correction amount suitable for each individual density.

It is preferable that the patch image be a black patch image printed in the print region at a constant density.

The above configuration enables the printed patch image to be used as the black reference.

It is preferable that the shading correction be made to relate a brightness range between the black reference and the white reference to a range between an upper limit and lower limit of brightness output from the sensor.

The above configuration can make the shading correction, based on the black and white references, thereby efficiently utilizing the output from the sensor.

It is preferable that the lower limit be determined based on reflectivity of the patch image.

The above configuration can make the shading correction with great precision by considering a portion of the patch image which has the lowest brightness ($\neq 0$).

It is preferable that the sensor include an area sensor and two or more light sources disposed at different locations.

In the above configuration, brightness of the patch image read by the sensor may depend on its read location, for example, due to differences in the length or angle of the path along which the light travels from the light sources to the area sensor through the patch image. However, this configuration can make the shading correction, based on the properties at individual locations to absorb the location dependence of the brightness of the patch image.

It is preferable that no diffuser be provided between the print medium and each of the light sources.

In the above configuration, the amount of light incident on the print medium may greatly vary with a location of the light source relative to the print medium. However, this configuration can make the shading correction, based on the properties at individual locations to absorb a varying amount of light incident on the print medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
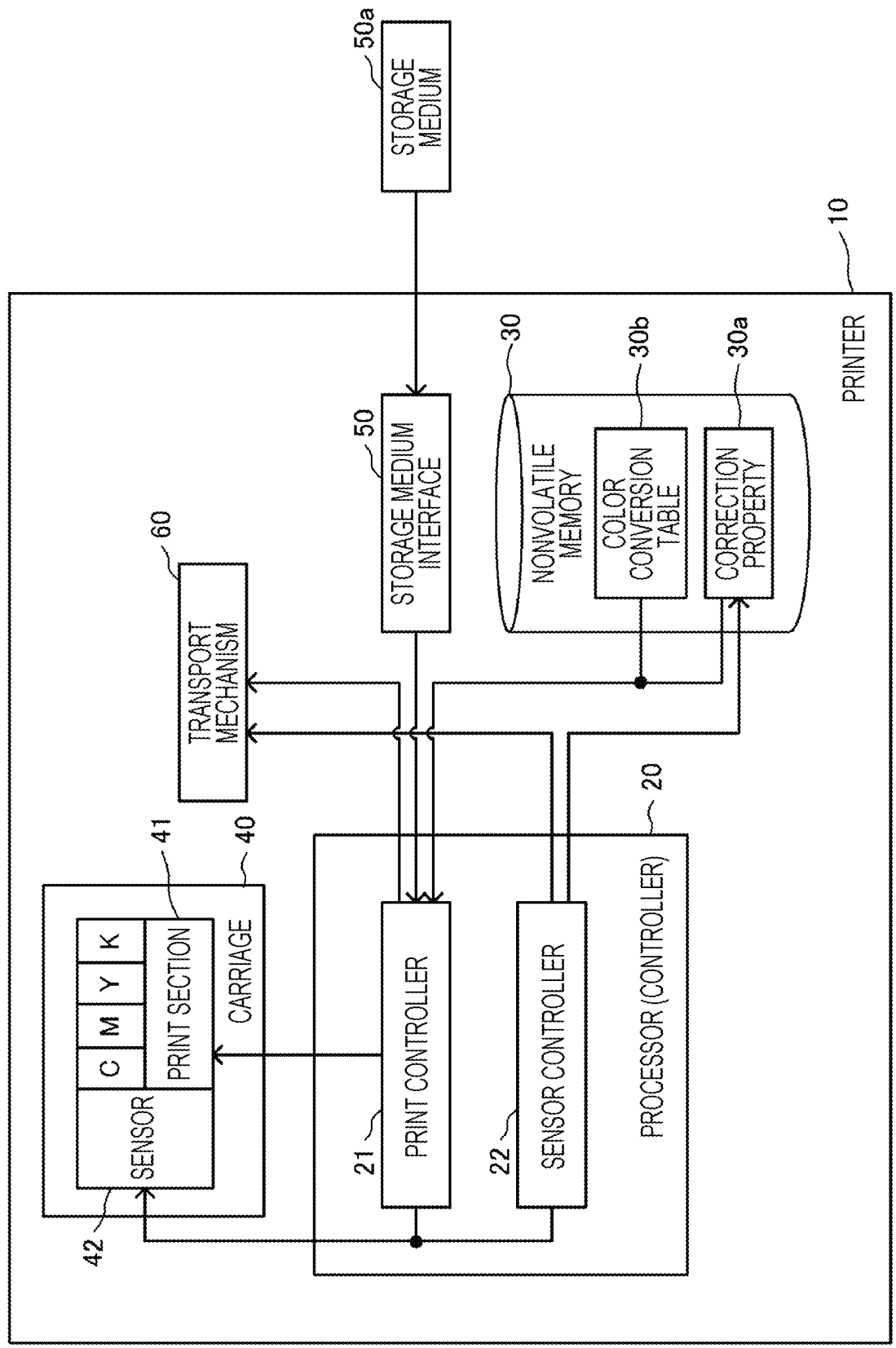
FIG. 1 is a block diagram of a printer according to an embodiment of the invention.

Some embodiments of the invention will be described in the order described below.
(1) Configuration of Printer
  (1-1) How to Acquire Shading Correction Property
  (1-2) How to Make Shading Correction
  (1-3) How to Make a Correction to Improve Print Quality
(2) Other Embodiments
(1) Configuration of Printer FIG. 1 is a block diagram of a configuration of a printer 10 according to an embodiment of the invention. Herein, the printer 10 corresponds to an image processing device. The printer 10 includes a processor 20 and a nonvolatile memory 30. The processor 20, which has a central processing unit (CPU) and random access memory (RAM), for example, executes a print control program, a sensor control program, and other programs stored in the nonvolatile memory 30. In addition to or instead of the nonvolatile memory 30, the printer 10 may include another type of storage medium. Herein, the processor 20 corresponds to a controller.

The printer 10, which may be an ink jet printer, further includes a carriage 40, a storage medium interface 50, and a transport mechanism 60. A storage medium 50a, which is a portable memory, for example, can be detachably attached to the printer 10 via the storage medium interface 50. The processor 20 thereby can acquire various data, such as image data, from the storage medium 50a. In addition to the storage medium 50a, the processor 20 may acquire data from other media. For example, the processor 20 may acquire data from a computer by wired- or wireless-communicating with it.

The transport mechanism 60 transports a print medium P in a predetermined direction. The processor 20 causes the transport mechanism 60 to transport the print medium P through a predetermined procedure. Mounted in the carriage 40 are a print section 41 and a sensor 42. The processor 20 causes the carriage 40 to reciprocate in predetermined directions. In the printer 10, the carriage 40 moves in the predetermined directions while keeping a preset distance from the print medium P.

The print section 41 includes a print head and ink tanks. The print head discharges four inks: cyan (C), magenta (M), yellow (Y), and black (K) inks. These CMYK inks are contained in the ink tanks attached to the print head. However, there is no limitation on the colors and number of inks. The print head has a plurality of ink ejection nozzles arrayed in a direction perpendicular to the reciprocation directions of the carriage 40. For example, the processor 20 may control the amounts of inks discharged from the print head through the ink ejection nozzles and the discharge timing.

In conjunction with the reciprocation of the carriage 40 in the predetermined directions, the ink head discharges the inks through ink ejection nozzles, thereby printing various images on the print medium P. More specifically, by repeatedly transporting the transport mechanism 60, moving the carriage 40, and discharging the inks from the print head, various images are printed on a printable area of the print medium P at a given location. In this embodiment, the transport direction of the print medium P is referred to below as the sub-scanning direction; the reciprocation directions of the carriage 40 are referred to below as the main scanning directions.

The sensor 42 reads an image on the print medium P which has been printed by the print section 41. The sensor 42 is provided in the carriage 40 adjacent to the print head of the print section 41 in the main scanning directions. The processor 20 moves the sensor 42 in the main scanning directions by moving the carriage 40. This configuration moves the sensor 42 over the print medium P in the main scanning directions, thereby enabling the sensor 42 to read an entire printable area on the print medium P. Therefore, the sensor 42 can read an image at any given location in the main scanning directions. In this case, the sensor 42 reads a print region and a non-print region on the print medium P; the print region refers to an area in which an image is printed, and the non-print region refers to an area in which no image is printed, namely, a blank area.

Based on the read result from the sensor 42, the print section 41 may automatically adjust its print quality. This print quality may be degraded due to various factors. Examples of such factors include: positional and manufacturing tolerances of the print head; a timing error of the inks discharged through the ink ejection nozzles; the difference between the quantity of the inks and a reference quantity; the difference between a discharge direction of the inks and a reference direction; an error of a transport amount of the transport mechanism 60; and an error contained in data (e.g., color conversion table) used for image processing and image processing parameters.

The degradation of the print quality may be prominent on an image printed by the print section 41. Therefore, by reading this printed image with the sensor 42, the processor 20 can estimate which factor degrades the print quality and reduce the influence of the estimated factor, after which the print section 41 prints images. For example, if estimating that an image read by the sensor 42 is printed at a density greater than an ideal one, the print section 41 may print the next image at a lower density, thereby improving the print quality.

Figure 2:
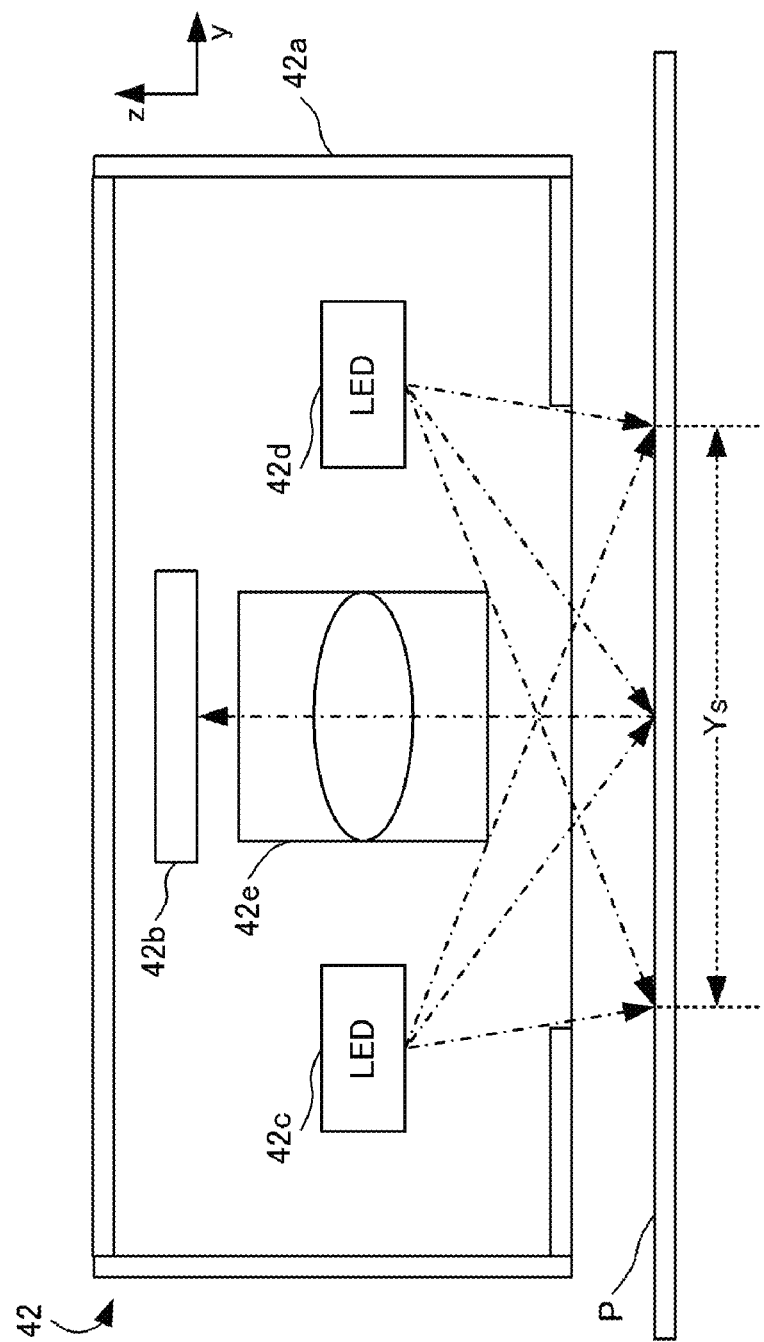
FIG. 2 illustrates a configuration of the sensor in the printer.

FIG. 2 schematically illustrates a configuration of the sensor 42. More specifically, FIG. 2 schematically illustrates the sensor 42 and the print medium P. In FIG. 2, a y-axis direction corresponds to the sub-scanning direction, and a z-axis direction corresponds to a direction perpendicular to the print surface. The main scanning directions correspond to the front and rear directions in the page of FIG. 2, which are perpendicular to both the y-axis and z-axis directions. In this embodiment, one of the main scanning directions corresponds to an x-axis direction.

As illustrated in FIG. 2, the sensor 42 has a housing 42a that defines its inner space in which an area sensor 42b, light emitting diodes (LEDs) 42c and 42d, and a lens 42e are disposed. The area sensor 42b has three types of sensor elements arranged in a two-dimensional fashion. The first type of sensor element senses brightness of red light through a red (R) color filter and provides an output according to the brightness. The second type of sensor element senses brightness of green light through a green (G) color filter and provides an output according to the brightness. The third type of sensor element senses brightness of blue light through a blue (B) color filter and provides an output according to the brightness.

The LEDs 42c and 42d in the sensor 42, each of which is a light source that irradiates the print medium P with the light, are disposed at different locations. The LEDs 42c and 42d may be arranged in the y-axis direction so as to be symmetric with respect to a line that extends in the z-axis direction and passes through the center of the area sensor 42b in the y-axis direction.

The lens 42e is disposed adjacent to the negative side of the area sensor 42b in the z-axis direction. When the light from the LEDs 42c and 42d is reflected and diffused on the print medium P, the light enters the sensor elements in the area sensor 42b through the lens 42e. In this way, the area sensor 42b can read the print medium P irradiated with light from the LEDs 42c and 42d. In FIG. 2, parts of the paths of light beams traveling to a sensing range Ys on the print medium P and parts of the paths of light beams traveling from the print medium P to the area sensor 42b through the lens 42e are each depicted with an alternate long and short dash line arrow.

The area sensor 42b is designed such that its sensing range Ys in the y-axis direction is wider than its sensing range in the x-axis direction. Therefore, the area sensor 42b can read a substantially rectangular region. As an example, the sensing range Ys in the y-axis direction may be 40 mm long, whereas the sensing range in the x-axis direction may be 20 mm long. However, there is no limitation on the shape and size of the area sensor 42b. As an alternative example, the sensing range Ys in the y-axis direction may be narrower than a sensing range in the x-axis direction.

The processor 20 reads an image printed on the print medium P, based on the brightnesses of the RGB colors sensed by the sensor elements in the area sensor 42b. In addition, the processor 20 moves the carriage 40 in the main scanning directions and acquires a location of the carriage 40 after it is moved. Then, the processor 20 relates the location of the carriage 40, or the sensor 42, in the main scanning directions to the image read by the sensor 42 at this location.

In the sensor 42, no diffuser is provided between the print medium P and each of the LEDs 42c and 42d (light sources). Therefore, the light from the LEDs 42c and 42d reaches the print medium P without being diffused by a diffuser on its light path. Likewise, the light reflected and diffused on the print medium P reaches the area sensor 42b without being further diffused by a diffuser on its light path. The brightness of the light sensed by the sensor 42 which has been reflected and diffused on the print medium P depends on the distance between the print medium P and each of the LEDs 42c and 42d.

In this embodiment, the light is relatively perfectly reflected and diffused on the non-print region of the print medium P in which no image is printed. However, the light is reflected and diffused differently on the print region of the print medium P, depending on its ink density. In this case, a light component reflected directly on the print medium P becomes more prominent. Even if an image has a uniform density, the result of reading the image may depend on the location of the sensor 42.

Figure 3:
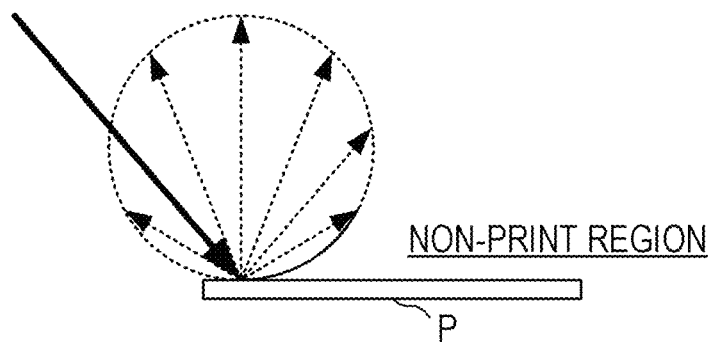
FIG. 3 illustrates the property of light reflected and diffused on a non-print region present at a periphery of the print medium.
Figure 4:
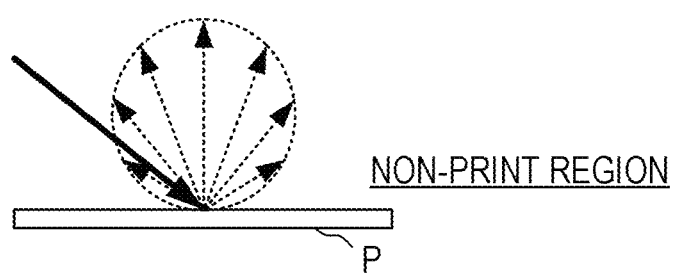
FIG. 4 illustrates the property of light reflected and diffused on the non-print region present at the periphery of the print medium.
Figure 5:
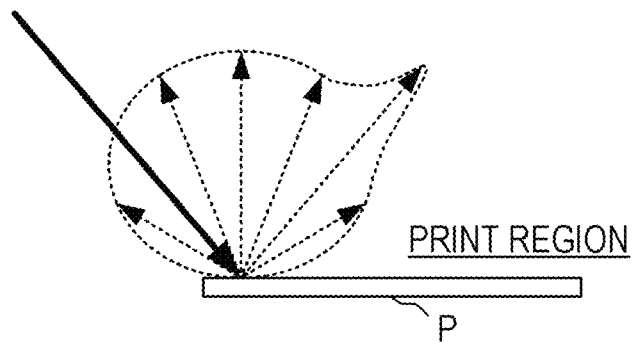
FIG. 5 illustrates the property of light reflected and diffused on a print region present at the center of the print medium.
Figure 6:
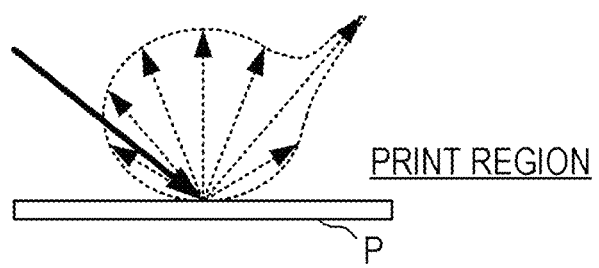
FIG. 6 illustrates the property of light reflected and diffused on the print region present at the center of the print medium.

FIGS. 3 to 6 each illustrate the property of the light reflected and defused on the print medium P. More specifically, FIGS. 3 and 4 each illustrate the light property when no image is printed in the sensing range Ys of the print medium P, namely, when the blank area, non-print region is read. FIGS. 5 and 6 each illustrate the light property when an image is printed in the sensing range Ys of the print medium P, namely, when the print region is read. Furthermore, FIGS. 3 and 5 each illustrate the light property of a periphery of the sensing range Ys on the print medium P in the y-axis direction, whereas FIGS. 4 and 6 each illustrate the light property of the center of the sensing range Ys on the print medium P in the Y-axis direction.

In each of FIGS. 3 to 6, the light component travels from the LED 42c to the print medium P is depicted by the solid line arrow, and the light components reflected on the print medium P are depicted by the broken line arrows. The length of each broken line arrow indicates the luminous intensity of a corresponding light component.

As illustrated in FIGS. 3 and 4, the light is substantially perfectly reflected and diffused on the non-print region. Therefore, by connecting the ends of the broken line arrows, a substantially perfect circle is formed. However, the circles in FIGS. 3 and 4 indicate that the luminous intensity is higher at the periphery than at the center, in other words, the light reflected and defused on the print medium P at the periphery is brighter than that at the center. A reason is that the periphery is closer to the LED 42c than the center. This tendency is true of the print region illustrated in FIGS. 5 and 6. The luminous intensity is higher at the periphery than at the center, in other words, the light reflected and defused on the print medium P at the periphery is brighter than that at the center. A reason is that the periphery is closer to the LED 42c than the center, as described above.

As illustrated in FIGS. 5 and 6, the light is imperfectly reflected and diffused on the print region, and the directly reflected component becomes relatively prominent. In this case, as the area sensor 42b is positioned closer to the path along which the light from the LEDs 42c and 42d is directly reflected on the print medium P, the brightness of the light sensed by the area sensor 42b becomes higher. As a result, the brightness of the light traveling along this path is prominently higher than that along any other path.

As described above, the brightness of the light sensed by the sensor 42 depends on a read location within the sensing range Ys. Thus, even if the sensor 42 reads an image having a uniform density within the sensing range Ys, the read results may differ from one another at individual locations. As a result, the read results can be gradient values depending on a read location. The location dependence of the results of reading the print region may be more complicated than that of reading the non-print region.

Figure 7:
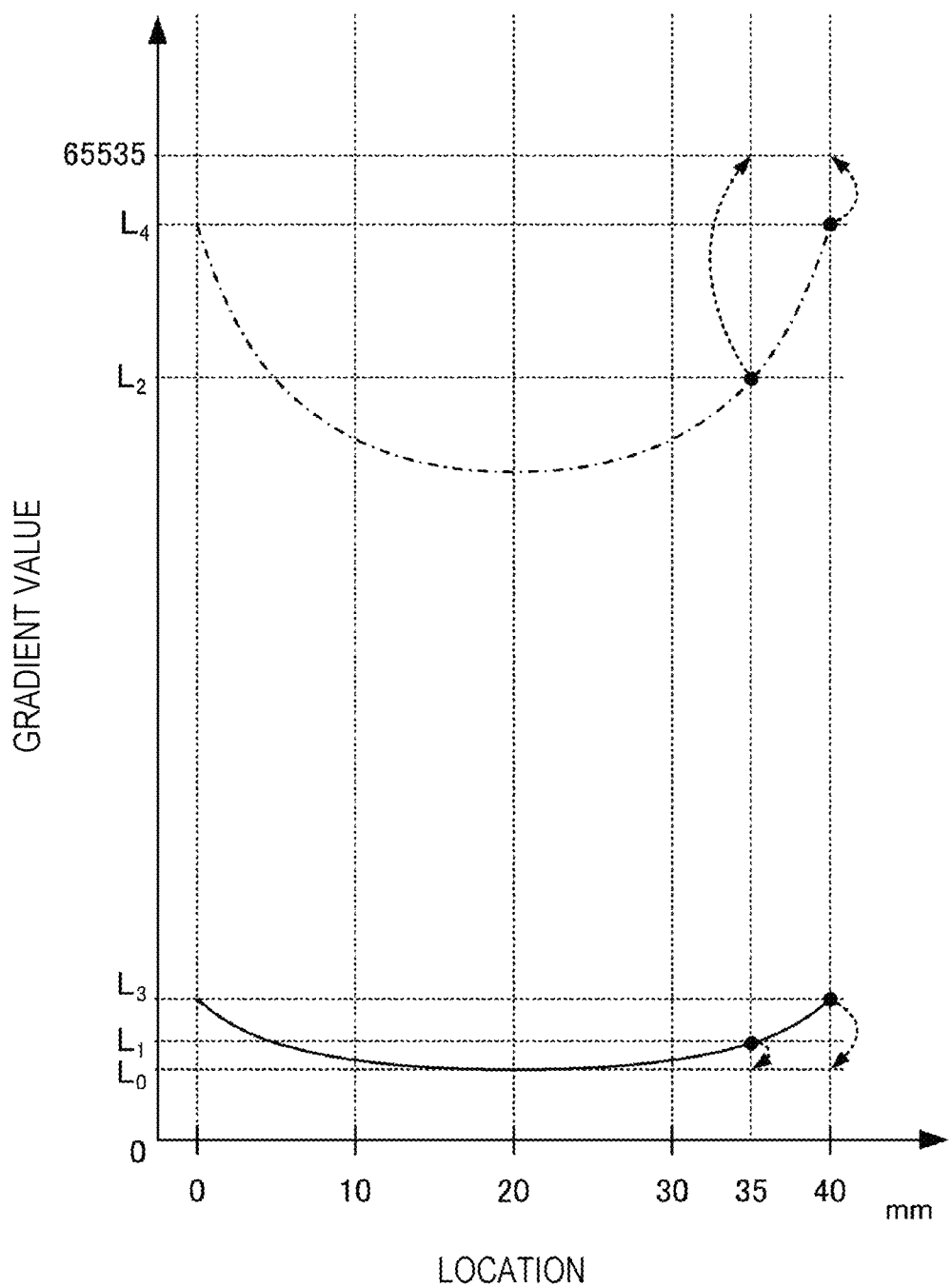
FIG. 7 is a graph used to explain the shading correction.

FIG. 7 is a graph showing the result of reading the print and non-print regions with the sensor 42 before a shading correction that will be described later is made. In FIG. 7, the vertical axis represents a gradient value, and the horizontal axis represents the read location. In this case, the sensor 42 is positioned at any fixed location in the sensing range Ys in the x-axis direction. Thus, this horizontal axis corresponds to the y-axis direction in FIG. 2. In this example, the length of the sensing range Ys in the y-axis direction may be set to 40 mm. In FIG. 7, the gradient value represented by the vertical axis corresponds to brightness of each color. This gradient value may be expressed in 16 bits and ranges from 0 to 65535.

In FIG. 7, the alternate long and short dash curve line indicates the result of reading the non-print region of the print medium P in which no image is printed, and the solid line indicates the result of reading the print region of the print medium P in which a black patch image is printed at a uniform density. The result of FIG. 7 shows that the gradient value becomes larger at each periphery (near 0 and 40 mm) of both of the non-print and print regions than at the center (near 20 mm). In other words, each image sensed at each periphery is brighter than that sensed at the center.

(1-1) How to Acquire Shading Correction Property

In this embodiment, the printer 10 reads images with the above location dependence eliminated or reduced. More specifically, the processor 20 makes the shading correction for the output from the sensor 42, based on the read result from the sensor 42. In this case, the processor 20 sets a patch image printed on the print region of the print medium P to a black reference and sets the non-print region to a white reference, and then makes the shading correction, based on the properties of the black and white references at individual locations. Then, the processor 20 makes the shading correction by suppressing the location dependences of the black and white references from emerging.

The processor 20 executes the sensor control program stored in the nonvolatile memory 30. By executing the sensor control program, the processor 20 serves as the sensor controller 22 (see FIG. 1) and performs a measurement for the shading correction and then makes the shading correction.

Figure 8:
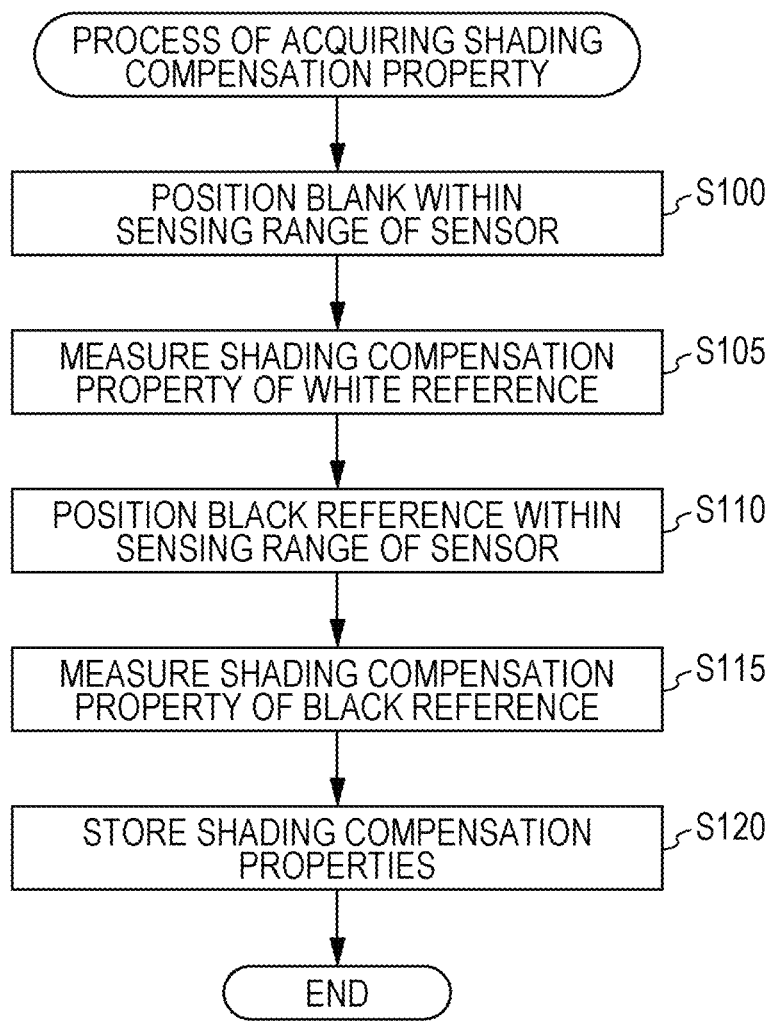
FIG. 8 is a flowchart of a process of acquiring a shading correction property.

FIG. 8 is a flowchart of a process of acquiring a shading correction property. Before making the shading correction, the processor 20 performs the process of acquiring the shading correction property illustrated in FIG. 8. The processor 20 needs to complete this process at least before the sensor 42 performs a read operation in order to correct an image to be printed by print section 41. Accordingly, the processor 20 may perform the process immediately before the print section 41 prints an image or may regularly perform it. Alternatively, the processor 20 may perform the process when the printer 10 is maintained (e.g., the head is replaced) or when its print conditions are changed (e.g., the type of a print medium is changed). In short, the processor 20 can perform the process at any given timing.

Before the processor 20 performs the process of acquiring a shading correction property, a black reference and a white reference are prepared. The black reference is a black patch image over the sensing range Ys of the sensor 42, and the white reference is a blank over the sensing range Ys. A medium with the black and white references is preferably the print medium P supported by the print section 41. It should be noted that each of the black and white references needs to have a uniform density over the sensing range Ys.

The printer 10 preferably prints the black patch image, which is to be used as the black reference, at a uniform density. For this purpose, the printer 10 may employ any configuration. As an example, the printer 10 may print the black patch image at a density high enough to suppress any non-uniformity, such as at a density higher than a usual one or a density at which ink is saturated on the print medium P. As another example, the printer 10 may print the black patch image beyond the sensing range Ys of the sensor 42, and then the sensor 42 reads it multiple times so that the density of the black patch image is averaged out. As a still another example, the processor 20 may employ any smoothing method to remove non-uniformity of the result of reading the black patch image. Obviously, a conditioned, reference printer may be used as the printer 10 to print the black patch image as the black reference.

The printer 10 needs to reproduce a uniformly dense black color in order to print the black patch image over the sensing range Ys of the sensor 42. In this embodiment, the printer 10 prints the black patch image at the maximum density by using the maximum quantity of K ink permitted for the print medium P.

In this embodiment, the white reference (non-print region) and the black reference (print region) are formed on the single print medium P at different locations. After obtaining the print medium P described above, a user places it on the printer 10. Then, the processor 20 starts to perform the process of acquiring a shading correction property. At Step S100, the processor 20 serves as the sensor controller 22 to cause the transport mechanism 60 and the carriage 40 to move the blank area on the print medium P to within the sensing range Ys of the sensor 42. More specifically, under the control of the processor 20, the carriage 40 moves the sensor 42 and the transport mechanism 60 transports the print medium P so that the blank area is positioned within the sensing range Ys of the sensor 42.

At Step S105, the processor 20 serves as the sensor controller 22 to measure a shading correction property of the white reference. More specifically, the processor 20 causes the sensor 42 to turn on the LEDs 42*c* and 42*d*. Then, the processor 20 acquires gradient values from the white reference, based on signals output from the area sensor 42*b*. Since the sensor elements in the area sensor 42*b* are arranged in a 2D fashion, the gradient values acquired from the white reference can be expressed as W (x, y), where x and y are coordinates within the sensing range Ys having given lengths in the x-axis and y-axis directions. In FIG. 2, the length of the sensing range Ys in the x-axis direction is not illustrated, but the length in the y-axis direction is denoted by Ys.

At Step S110, the processor 20 serves as the sensor controller 22 to cause the transport mechanism 60 and the carriage 40 to move the black patch image to within the sensing range Ys of the sensor 42. More specifically, under the control of the processor 20, the carriage 40 moves the sensor 42 and the transport mechanism 60 transports the print medium P so that the black patch image formed on the print medium P at a predetermined location is positioned within the sensing range Ys of the sensor 42. However, the processor 20 does not necessarily have to move the sensor 42, provided that only the transporting of the print medium P enables the sensor 42 to read the black reference.

At Step S115, the processor 20 serves as the sensor controller 22 to measure a shading correction property of the black reference. More specifically, the processor 20 causes the sensor 42 to turn on the LEDs 42c and 42d. Then, the processor 20 acquires gradient values from the black reference, based on signals output from the area sensor 42b. The gradient values acquired from the black reference can be expressed as B (x, y), where x and y are in the same value range as that of x and y, respectively, of W (x, y).

After the measurement, at Step S120, the processor 20 stores, as a correction property 30a, the gradient values acquired from the white and black references, in the non-volatile memory 30. Since each of the white and black references were formed of a uniformly dense pattern, all the gradient values acquired would be equated with one another, independently of a relative location of the area sensor 42b in the sensor 42. In fact, however, the brightness of each of the white and black references may depend on a relative location of the area sensor 42b in the sensor 42, as described above.

In this embodiment, W (x, y) and B (x, y), which are the gradient values acquired from the white and black references, respectively, each exhibit a location-dependent property. W (x, y) and B (x, y) are referred to correctively as the correction property 30a. In this embodiment, the x-axis direction corresponds to one of the main scanning directions, and the y-axis direction corresponds to the sub-scanning direction. Thus, the location-dependent property of each of the white and black references is related to locations in the moving directions of the carriage 40 and a direction perpendicular to the moving directions of the carriage 40. However, the shading correction made by the printer 10 can absorb the differences of W (x, y) and B (x, y) in both directions. By plotting the gradient values W (x, y) of the correction property 30a under the condition of x being a constant, the curve represented by the alternate long and short dash curve line in FIG. 7 is obtained. Likewise, by plotting the gradient values B (x, y) of the correction property 30a under the condition of x being the constant, the curve represented by the solid curve line in FIG. 7 is obtained.

(1-2) How to Make Shading Correction

Next, a description will be given of the shading correction to be made for the correction property 30a acquired in the above manner. In this embodiment, the shading correction is made to relate a brightness range between the black and white references to a range between the upper and lower limits of the signals output from the sensor 42. This shading correction may be applied to a brightness range expressed in any given unit. In other words, the shading correction may be applied to any form of signal from the sensor 42. For example, this signal may indicate reflectivity or a gradient value expressed in an analog or digital form.

In the shading correction, it is necessary to discriminate between the white and black references from the read results. More specifically, in the example of FIG. 7, the range between the solid curve line and the alternate long and short dash curve line corresponds to the brightness range between the black and white references. For example, at the location of 35 mm, the brightness of the black reference has a gradient value $L_1$, and the brightness of the white reference has a gradient value $L_2$.

In the above example, when the shading correction is made, the gradient value $L_2$ is related to the upper limit of the brightness range, and the gradient value $L_1$ is related to the lower limit of the brightness range. In this embodiment, the upper limit of the brightness range indicates the maximum brightness, and the lower limit of the brightness range is determined based on the reflectivity of the black patch image. The gradient value $L_2$ acquired by reading the white reference with the sensor 42 is regarded as 65535, which is the upper limit, whereas the gradient value $L_1$ acquired by reading the black reference is regarded as the lower limit $L_0$. Since the shading correction is based on the location-dependent property, a compensation amount to be used varies with the location. At the location of 40 mm, for example, a gradient value $L_4$ acquired by reading the white reference is regarded as 65535, which is the upper limit, whereas a gradient value $L_3$ acquired by reading the black reference is regarded as a lower limit $L_0$. In FIG. 7, the correspondence relationship between the gradient values of the white and black references is indicated by the broken line arrows.

For example, the above compensation can be made in accordance with the following equation:

$$R(x, y) = [((S(x, y) - B(x, y))/(W(x, y) - B(x, y))] \times (100 - \text{(black reflectivity)})] + \text{(black reflectivity)} \quad (1),$$

where R (x, y) denotes an output of the shading correction at a location (x, y) which is expressed by reflectivity, and S (x, y) denotes a gradient value of an image for which the shading correction is to be made, at the location (x, y). In short, the processor 20 makes the shading correction for the read result at the location (x, y), based on the gradient values W (x, y) and B (x, y) of the correction property 30a.

The black reflectivity refers to a measurement of the reflectivity of light on the black patch image, or the black reference. This measurement may be obtained from the sensor 42 or any other instrument such as a colorimeter. It should be noted that the measurement may be an absolute or relative value indicating brightness of the black patch image which is obtained under the condition of the location dependence being suppressed.

Equation (1) contains the black reflectivity in the second term, so that the lower limit of output R (x, y) of the shading correction is set to the black reflectivity. In general, the amount of light reflected on the black reference tends to be very low but not zero. This is because only a small amount of light is reflected and diffused on the black reference even if the black reference is a black patch image printed at the maximum density. In this embodiment, the black reflectivity is thus expressed by a finite value. In the example of FIG. 7, the lower limit $L_0$ of the gradient value corresponds to the black reflectivity.

The black reflectivity may be any fixed value, such as 7%, suitable for a gradient value indicating brightnesses of the black patch image. Furthermore, the output R (x, y) of equation (1) is expressed as reflectivity, but alternatively may be expressed as a gradient value. In short, the output R (x, y) may be determined in any unit suitable for the shading correction.

Figure 9:
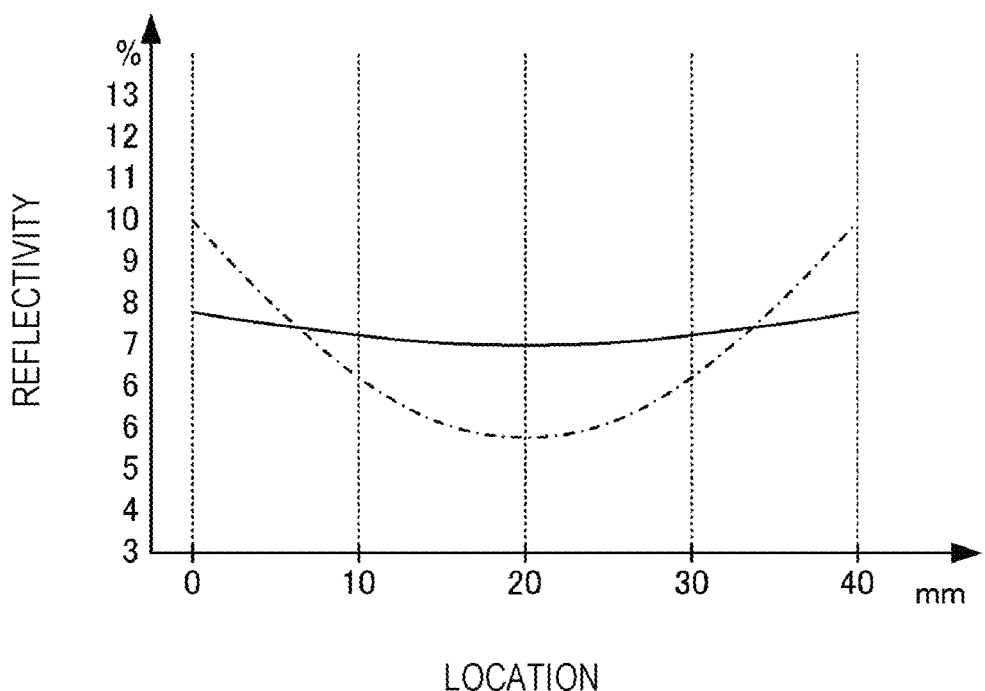
FIG. 9 is a graph showing the result of the shading correction.

FIG. 9 is a graph used to explain the effect of the shading correction according to this embodiment. In FIG. 9, the solid curve line indicates a result of making the shading correction for the result of reading the black patch image with the sensor 42 as in the example of FIG. 7. The horizontal axis represents the read location similar as in the case of FIG. 7, and the vertical axis represents reflectivity.

In FIG. 9, the alternate long and short dash curve line indicates a referential result of the shading correction, which is acquired with the LEDs 42c and 42d turned off. This reference result can be expressed by the following equation:

$$R_{REF}(x, y)=[(S(x, y)-D(x, y))/(W(x, y)-D(x, y))] \times 100 \quad (2).$$

where $R_{REF}(x, y)$ denotes an output of the shading correction at a location (x, y) which is expressed by reflectivity, and W (x, y) and S (x, y) are the same as that in equation (1), and D (x, y) denotes the read result acquired with the LEDs 42c and 42d turned off.

The read result acquired with the LEDs 42c and 42d turned off exhibits no location dependence property. This means that the brightness of light reflected on the black reference can be regarded as a constant, such as zero, independently of the read location. However, if the shading correction property is determined in this manner, the shading correction may fail to sufficiently absorb the location dependence of the result of reading the print region. For example, if the processor 20 makes the shading correction in accordance with equation (2), namely, without considering the location dependence of the black reference, the resultant reflectivity may exhibit a location-dependence property, as indicated by the alternate long and short dash curve line in FIG. 9.

However, the shading correction according to equation (1) considers the location dependence of the black reference. As a result, the processor 20 can acquire the reflectivity of the black reference which with its location dependence suppressed, as indicated by solid curve line in FIG. 9. This shading correction enables the printer 10 to absorb location-dependence properties of the results of reading the white reference and the black reference such as a black patch image. Consequently, it is possible to make the shading correction with great precision.

(1-3) How to Make Correction to Improve Print Quality

Figure 10:
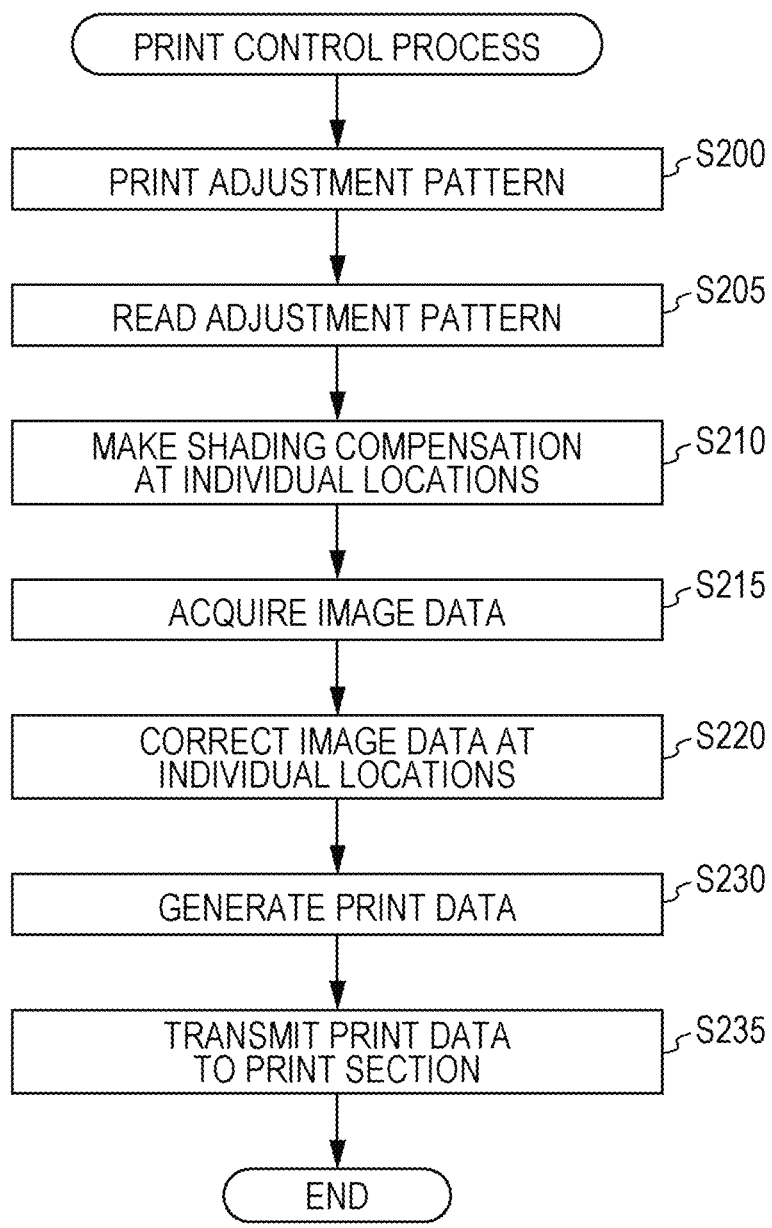
FIG. 10 is a flowchart of a print control process.

Next, a detailed description will be given of a process of printing quality images on the print medium P, based on a read result from the sensor 42. FIG. 10 is a flowchart of a print control process in which the influence of a factor of degrading a print quality is eliminated or reduced before an image is printed on a print target. In this embodiment, the sensor 42 reads an adjustment pattern for use in highlighting a location at which the print quality may be degraded and then eliminates or reduces the influence of the degradation factor.

The processor 20 executes the print control program stored in the nonvolatile memory 30. By executing the print control program, the processor 20 serves as the print controller 21 (see FIG. 1) and reads the adjustment pattern. Then, the processor 20 makes a correction based on the read result and prints an image. The adjustment pattern is used as a reference pattern with which the processor 20 will correct an image to be printed by the print section 41. It should be noted that the adjustment pattern is neither the black reference nor white reference that has been used for the shading correction.

When performing the print control process, at Step S200, the processor 20 prints one or more adjustment patterns. In this case, various types of adjustment patterns may be prepared in accordance with factors of degrading a print quality. Hereinafter, a description will be given regarding a case where an adjustment pattern is used to improve a degraded print quality in the y-axis direction. In this case, any factor of printing an image at a non-uniform density in the y-axis direction is present in the print section 41. As a result, the center portion of the printed image has a density different from an ideal one. This factor may be due to a displacement or angle of the ink ejection nozzles.

As an example, the adjustment pattern to be used may be a solid pattern having a uniform density. In this example, the processor 20 may cause the print section 41 and the transport mechanism 60 to print the solid pattern on the print medium P at a predetermined location. If no factor of printing an image at a non-uniform density in the y-axis direction were present in the print section 41, the solid pattern would be printed on the print medium P at a uniform density.

Figure 11:
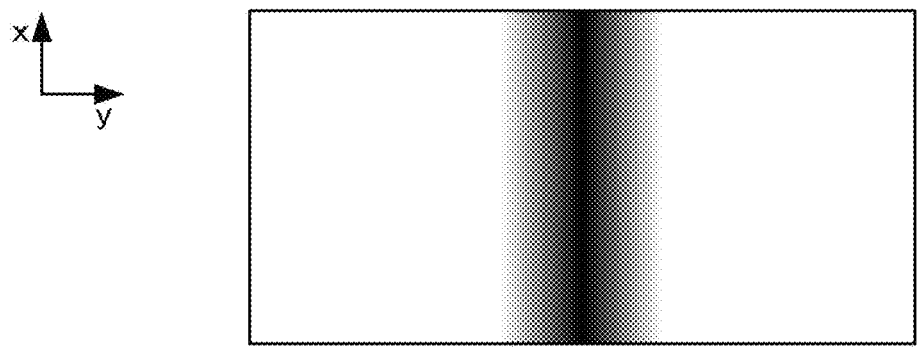
FIG. 11 schematically illustrates an adjustment pattern printed at a non-uniform density.

In fact, however, a factor of printing an image at a non-uniform density in the y-axis direction is present in the print section 41. FIG. 11 schematically illustrates an adjustment pattern printed at a non-uniform density. More specifically, FIG. 11 illustrates the rectangular sensing range Ys of the sensor 42, which contains the adjustment pattern whose density varies in the y-axis direction (sub-scanning direction). As can be seen from FIG. 11, the adjustment pattern has white, gray, and black portions. The white portion is printed at an appropriate density, and the gray and black portions are each printed at a density higher than the appropriate density.

When the print section 41 attempts to print a uniformly dense solid pattern as the adjustment pattern, if the printed solid pattern has a non-uniform density as illustrated in FIG. 11, any factor of degrading the print quality can be present in the print section 41. If the printed solid pattern has a uniform density, no degradation factor can be present in the print section 41.

Figure 12:
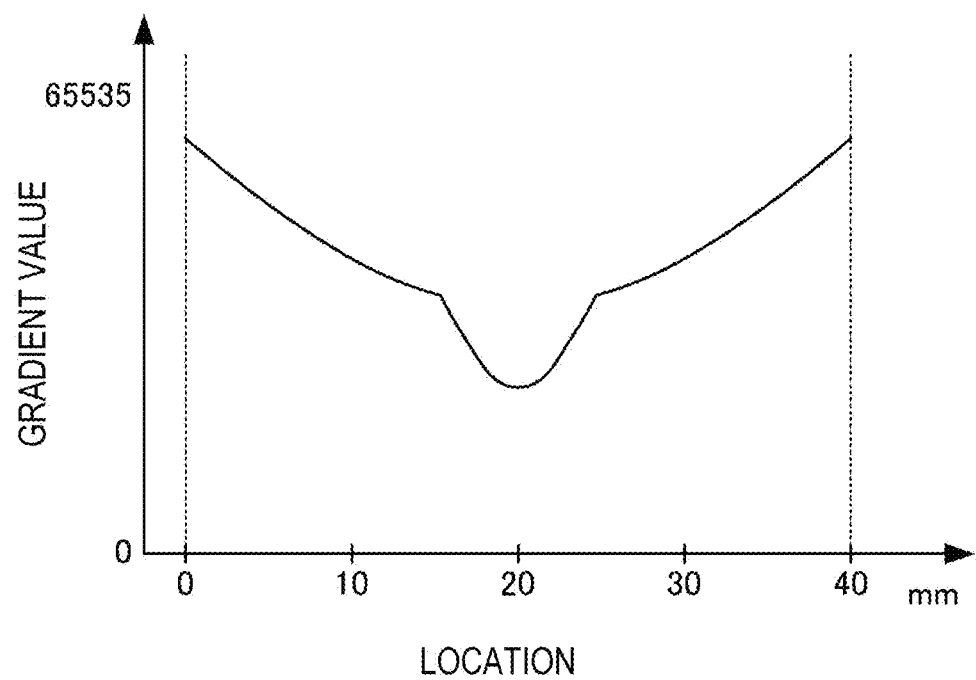
FIG. 12 is a graph showing a read result before the shading correction is made.

To check whether any degradation factor is present in the print section 41, at Step S205, the processor 20 serves as the print controller 21 to read the adjustment pattern with the sensor 42. In this case, for example, the read result exhibits a property as illustrated in FIG. 12, because the processor 20 has not yet made the shading correction. Thus, the sensing range Ys of the sensor 42 exhibits a lower brightness at the center (at the location of about 20 mm in FIG. 12) and a higher brightness at the peripheries (at the locations of about 0 and 40 mm). In other words, the sensing range Ys is relatively bright at the center and relatively dark at the peripheries in accordance with the non-uniform density of FIG. 11. Even in the portion of the adjustment pattern that looks a uniformly dense solid pattern, its density may be actually non-uniform.

At Step S210, the processor 20 serves as the print controller 21 to make the shading correction at individual locations. More specifically, the processor 20 refers to the correction property 30a stored in the nonvolatile memory 30 and then acquires the gradient values B (x, y) and W (x, y) obtained at the individual locations of black and white references, respectively. Then, the processor 20 sets the gradient value read at Step S205 to the gradient value S (x, y) and acquires the output R (x, y), which is the reflectivity at the location (x, y) after the shading correction is made, in accordance with equation (1).

Figure 13:
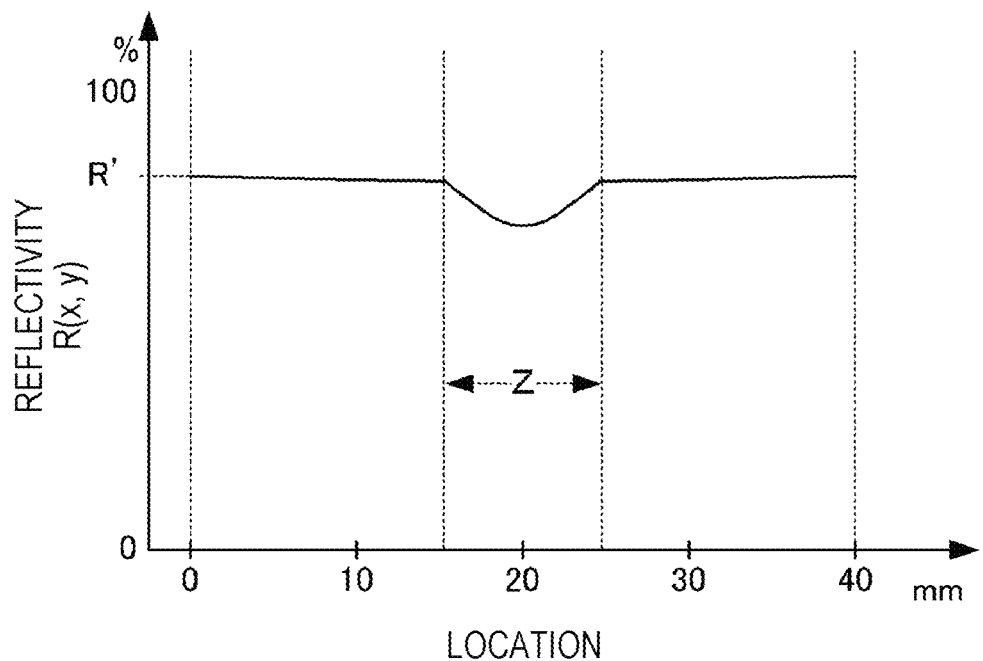
FIG. 13 is a graph showing a result after the shading correction is made.

Making the shading correction in the above manner provides the reflectivity as illustrated in FIG. 13. FIG. 13 demonstrates that this shading correction successfully reduces the dependence of reflectivity on the reading operation of the sensor 42. In the result of the shading correction illustrated FIG. 13, the portion with the uniform reflectivity corresponds to the uniformly dense portion of the adjustment pattern, and the portion with the low reflectivity corresponds to the lowly dense portion of the adjustment pattern.

At Step S215, the processor 20 serves as the print controller 21 to acquire image data. More specifically, the processor 20 acquires the image data on an image to be printed, from the storage medium 50a through the storage medium interface 50. The image to be printed may be designated by any given method. For example, the user may select it by operating an unillustrated input section in the printer 10.

At Step S220, the processor 20 serves as the print controller 21 to correct the image data at individual locations. In this case, the processor 20 determines a correction method of eliminating or reducing the degradation of the print quality in the print section 41, based on the output of the shading correction. In FIG. 13, for example, the processor 20 discriminate between a portion (range Z) in which the reflectivity may differ from a true one and portions (other ranges) in which the reflectivity may be identical to the true one. Then, the processor 20 determines a true value R' from the reflectivity in the other ranges. After that, the processor 20 corrects the image data such that the reflectivity of a pixel to be printed at the location (x, y) becomes R'/R (x, y). If the reflectivity is higher than true value R', the processor 20 corrects the image data such that the reflectivity becomes R (x, y)/R'. In this way, the processor 20 successfully eliminates or reduces the degradation of the print quality.

It is possible to identify the correspondence relationship between a sensing location (x, y) of the sensor 42 and an image to be printed at this sensing location, for example, based on a printed adjustment pattern. Therefore, at Step S200, the processor 20 prints an adjustment pattern at a predetermined location, based on an image on the adjustment pattern. Then, the processor 20 relates coordinates of the image of the adjustment pattern to locations at which this image is to be printed. When the sensor 42 reads the adjustment pattern printed at a known location at Step S205, the processor 20 recognizes a correspondence relationship between the sensing location (x, y) of the sensor 42 and the location at which the image is to be printed.

When the print section 41 prints an image based on image data, the processor 20 determines a location at which this image is to be printed. Then, based on the determined location, the processor 20 relates the sensing location (x, y) of the sensor 42 to the image to be printed at this location. Therefore, the processor 20 can correct a pixel image to be printed at a location related to the sensing location (x, y) of the sensor 42 by using a coefficient (R'/R (x, y)), which is determined based on the shading correction property. In this way, the processor 20 can make the correction, thereby successfully eliminating or reducing the degradation of the print quality.

The processor 20 may employ any given configuration to correct the image data. As an example, the processor 20 may multiply gradient values contained in the image data by R'/R (x, y). As an alternative example, the processor 20 may convert the gradient values to reflectivities, then multiply the reflectivities by R'/R (x, y), and reconvert the resultant values into gradient values. Moreover, the processor 20 may correct RGB image data or converted CMYK image data. In this embodiment, the location dependence emerges in the read result from the sensor 42, independently of any location in the main scanning directions. The factor of degrading the print quality also emerges in the read result from the sensor 42, independently of any location in the main scanning directions. However, if the read result from the sensor 42 depends on a location in the main scanning directions, the processor 20 may individually correct the read result for each location in the main scanning directions.

At Step S230, the processor 20 serves as the print controller 21 to generate print data. More specifically, the processor 20 performs image processing, based on the image data, thereby generating print data for use in printing the image indicated by the image data. Examples of the image processing include, but not limited to: a process of adjusting the number of pixels in accordance with a print size and resolution; a process of converting colors in the RGB color space into those in the CMYK color space, based on a color conversion table 30b; and a process of generating data indicating whether to discharge ink droplets for individual pixels, based on pixel colors indicated by CMYK gradient values.

After generating the print data, at Step S235, the processor 20 serves as the print controller 21 to transmit the print data to the print section 41. In response to reception of the print data, the print section 41 prints the image indicated by the print data. According to the configuration described above, the printer 10 identifies a factor of degrading a print quality of the print section 41, based on a result of reading an adjustment pattern with the sensor 42. After that, the printer 10 prints an image with the identified factor eliminated or reduced. Since the output that the sensor 42 generates by reading the adjustment pattern has been subjected to the shading correction, the sensor 42 can read it without being greatly influenced by the location dependence of the patch image. This configuration enables the printer 10 to precisely identify a factor of degrading a print quality of the print section 41 and to correct the identified factor.

(2) Other Embodiments

The foregoing embodiment is one example, and other embodiments may be employed accordingly. For example, an image processing device in the embodiment may be incorporated in a printer, scanner, multifunction peripheral (MFP), and other apparatuses. A method, as in the foregoing embodiment, of forming a black reference from a patch image and making a shading correction based on properties of the black reference at individual locations may be implemented by the image processing device, an image processing program, an image processing method, and a method of generating readout data.

The functions described herein may be implemented by a hardware resource, a software resource, or the combination of the software and hardware resources. If the hardware resource is employed, the functions are specified by a configuration. In this case, these functions do not necessarily have to be implemented by physically independent hardware resources. If the software resource is employed, the functions are specified by a program. The foregoing embodiment, which is an example, may undergo any partly omission, addition, and/or replacement.

A sensor only has to read a print region, in which an image is printed, and a non-print region, which is a blank area, in a print medium. More specifically, a controller only has to make shading correction for read results from the sensor at individual locations. In short, the sensor only has to read a region containing locations at which correction is to be made. For this purpose, the sensor may be movable as in the foregoing embodiment. Alternatively, the sensor may be fixed such that an entire corrected target is contained in its coverage area or may include a plurality of sensor units fixed such that the entire corrected target is contained in their coverage area. If the sensor is movable, any given moving configuration may be employed. For example, a moving configuration that includes a carriage in which a print section and the sensor are mounted may be employed.

A print medium may be a print sheet or other medium, which becomes brightest when no recording material, such as an ink or toner, is recorded thereon and becomes darker as a recording material is recorded thereon at a higher density, in other words, as a higher amount of recording material is recorded thereon. The color of the print medium may be white or transparent, for example. However, when no recording material is recorded on a print medium, this print material may be regarded as a white reference, regardless of its color.

Herein, a print region refers to a region in which an image is printed, and a non-print region in which no image is printed. More specifically, the non-print region may be a region of a print medium in which an image can be printed but not printed, in which an image cannot be printed, or to which a carriage cannot move.

A sensor may employ any other configuration in addition to a configuration with an area sensor. For example, the sensor may be a line sensor. In this case, the sensor may read a print region and a non-print region by moving relative to a print medium.

A controller may make shading correction for an output from a sensor, based on a read result from the sensor. Further, the controller may make the shading correction, based on properties of each of a black reference and a white reference at individual locations. In general, when a sensor reads the black and white references, location dependence may emerge in their read results even if their density is uniform.

To eliminate or reduce the influence of the location dependence, the controller may acquire shading correction properties at individual locations. The property to which shading correction is applied may be related to a sensor. More specifically, even if a black reference and a white reference are each formed of a uniformly dense pattern, light from a light source in the sensor reaches each of the black and white references differently at individual locations. For example, at these locations, the amounts, angles, and reflectivities of the light, the distances from a lens, a sensor element, and the light source may differ.

To eliminate or reduce the location dependence of a read result from the sensor, the controller acquires the shading correction properties. An image printed by a print section may also contain location-dependence errors due to a manufacturing tolerance of a nozzle array, for example. As a result, qualities of the printed image at respective locations might differ from one another. Nevertheless, the shading correction has difficulty eliminating or reducing this property. Therefore, the controller corrects errors in an image which are attributed to the print section, based on the read result from the sensor.

The controller may acquire only properties that may become prominent, from results of reading each of the black and white references with the sensor at individual locations. For example, if amounts, angles, and reflectivities of the light from a light source in the sensor to each of the black and white references and distances from a lens, a sensor element, and the light source differ at individual locations, these properties can be regarded as being prominent. Therefore, the controller may acquire, as the properties, reflectivity and/or an optical (e.g., optical length) property of the black and white references at each location.

To evaluate the properties described above, the controller may employ any given method. As an example, the controller may acquire gradient values from read results at individual locations, as in the embodiment. As an alternative example, the controller may acquire the differences between the results of reading each of the black and white references at individual locations and a statistical value (e.g., average or median) calculated from the results. If the location dependence of the results of reading the black and white references changes with the location of a movable sensor, the controller may store the properties of the black and white references at individual locations in relation to the locations of the sensor that has moved. If the positional relationship between the sensor and a print medium varies with a plurality of directions (main scanning and sub-scanning directions), the controller may identify relative positional relationships between the sensor and the print medium in the plurality of directions. Then, the controller may determine properties of the black and white references at individual locations in relation to the relative positional relationship.

A black reference may be any patch image printed on a print region as long as it can be regarded as the black reference. The black reference is preferably a patch image that is larger in size than a sensing range of a sensor, so that the sensor can read the black reference with great precision. In the foregoing embodiment, the black reference is a black patch image printed at the maximum, uniform density. However, the black reference may also be a black patch image printed at a lower density, as long as this patch image can be used as a low-lightness reference for shading correction. To print a patch image as the black reference, a recording material with any color may be used. For example, the recording material may have a single color such as black or a mixture of a plurality of chromatic colors such as cyan, magenta, and yellow.

A patch image to be used as a black reference is preferably printed on a print medium at a uniform density, namely, without its location dependence suppressed, because shading correction is performed based on its patch image. Therefore, if the patch image is printed by a print section, the print section is preferably subjected in advance to necessary calibration such as a banding correction. Alternatively, the print section may be a standard printer that needs no calibration. In addition, a printer that prints a patch image as the black reference does not necessarily have a sensor.

A controller may include one or more chips that can execute desired processes. In addition, the controller does not necessarily have to be provided with a CPU and a RAM as in the foregoing embodiment. Alternatively, the controller may be provided with an application specific integrated circuit (ASIC) instead of a CPU or may be provided with both an ASIC and a CPU and operate them in relation to each other.

A print section only has to print an image in a print region. To print an image, the print section may employ any given print system, such as an ink jet system or an electro-graphic system. An adjustment pattern is used to identify a print property of the print section, such as differences between a print result and an ideal print result at individual locations. This adjustment pattern may be any given pattern according to the type of correction to be made or in accordance with a density of an image to be corrected. The print section only has to print an adjustment pattern that can be used to identify its print property.

A controller may correct a print property of a print section, based on an output of shading correction such that the print section can print a corrected image. More specifically, when a sensor reads an adjustment pattern after the shading correction is made, its output is not greatly influenced by the location dependence of the read result which is attributed to the sensor. If an adjustment pattern read after the shading correction differs from an expected one, any error may be caused in the print section. In this case, the controller may eliminate or reduce the error by correcting a printed image.

To correct an image to be printed, a controller may employ a method of correcting image data as in the foregoing embodiment; however, the controller may employ any other correction method. For example, the controller may employ a method of correcting a voltage or a signal waveform applied to a print head, a method of correcting an amount of a print medium transported by a transport device, or a method of correcting or adjusting mechanisms or (a layout of) parts.

A print section may print a plurality of adjustment patterns. More specifically, the print section may print adjustment patterns for a plurality of factors of degrading the print quality or for a single degradation factor. For example, the print section may print adjustment patterns at different densities for a single degradation factor. Then, the controller may cause a sensor to read the adjustment patterns and make shading correction for the read results. After that, the controller may correct an image to be printed, based on an output of the shading correction and may cause a print section to print the corrected image.

More specifically, at Step S200 of the print control process in FIG. 10, the processor 20 may cause the print section 41 to print a plurality of adjustment patterns. In the foregoing embodiment, the adjustment patterns are formed of solid patterns printed at a certain density. However, the adjustment patterns may be formed of solid patterns printed at different densities.

Figure 14:
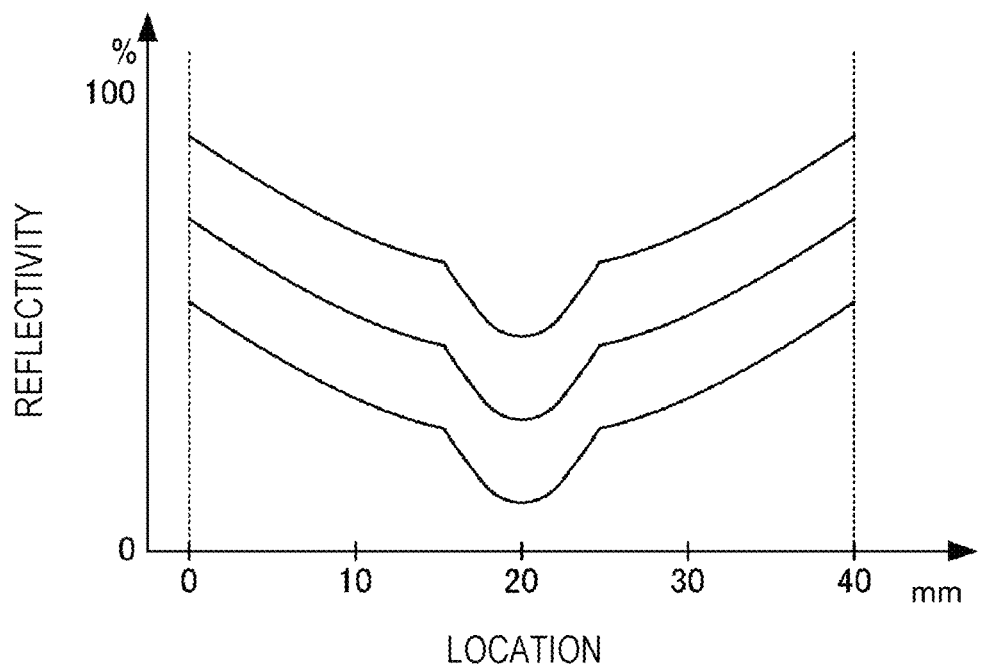
FIG. 14 is a graph showing a read result before the shading correction is made with a plurality of adjustment patterns having different densities.
Figure 15:
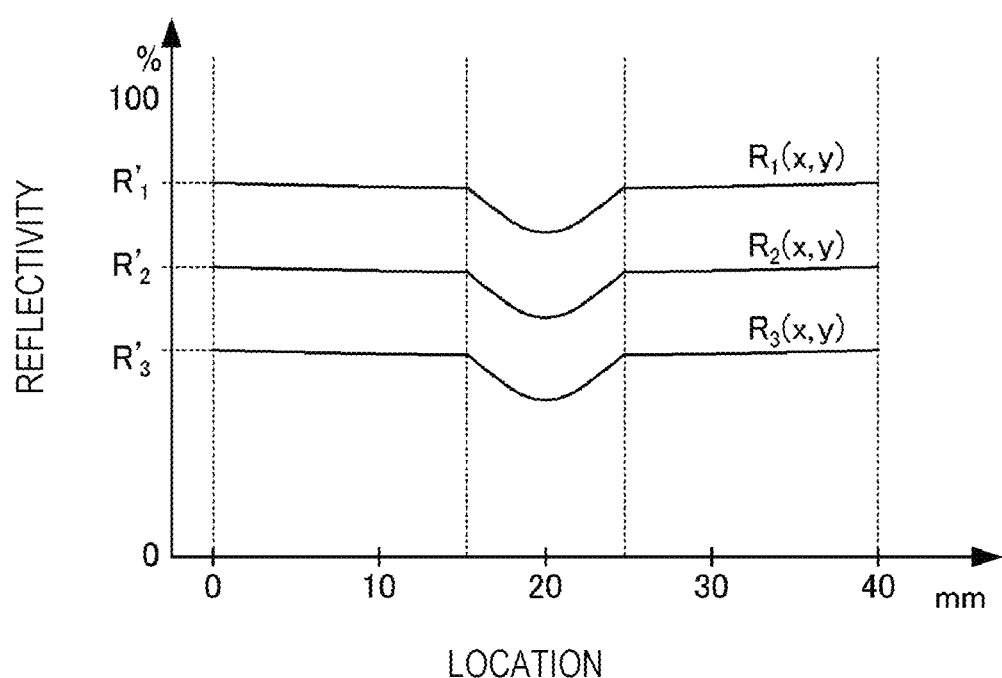
FIG. 15 is a graph showing the result of the shading correction with the plurality of adjustment patterns having the different densities.

At Step S205, the processor 20 may read the adjustment patterns. In the example of FIG. 14, the results of reading three adjustment patterns are used. At Step S210, the processor 20 may make the shading correction at individual locations. If three adjustment patterns are used as in an example of FIG. 15, for example, the processor 20 may identify uniform portions of reflectivities of the adjustment patterns as values $R'_1$, $R'_2$, and $R'_3$, and may also identify reflectivities at a certain location as values $R_1(x, y)$, $R_2(x, y)$, and $R_3(x, y)$.

At Step S220, the processor 20 can make the correction with greater precision, based on properties closer to reflectivities indicated by gradient values in uncorrected image data. For example, if reflectivity indicated by a gradient value is close to the value $R'_1$, the processor 20 may make the correction such that the reflectivity in a corresponding pixel increases by $R'_1/R_1(x, y)$. Optionally, the processor 20 may perform interpolation between values $R'_1$, $R'_2$, and $R'_3$.

In the foregoing embodiment, the sensor 42 may have at least two light sources disposed at different locations; however, the sensor 42 may have any other configuration. As an alternative example, the sensor 42 may have one or three or more light sources. In addition, the light sources do not necessarily have to be symmetric to the optical axis of the lens 42e.

This application claims priority to Japanese Application No. 2018-032909, filed Feb. 27, 2018, the entirety of which is incorporated by reference herein.

What is claimed is:

1. An image processing device comprising:
   a sensor mounted in a carriage configured to reciprocate at a predetermined, fixed distance from a print medium, and configured to read a print region and a non-print region of the print medium, an image being printed in the print region, the non-print region being a blank area; and
   a controller configured to:
   move the carriage in a prescribed direction;
   set a patch image printed in the print region to a black reference;
   set the non-print region to a white reference; and
   make a shading correction for an output from the sensor based on a read result from the sensor, and based on predetermined location-dependent properties of the black reference and the white reference for different locations within the black reference and the white reference,
   wherein the different locations within the black reference and the white reference are different in one or both of: the prescribed direction in which the carriage moves and a direction perpendicular to the prescribed direction.

2. The image processing device according to claim 1, wherein
   the carriage includes a print section configured to print the image in the print region, and
   the controller is configured to make the shading correction, based on an output that the sensor generates by reading an adjustment pattern and correct the image to be printed by the print section, based on an output for which the shading correction has been made, the adjustment pattern being printed by the print section.

3. The image processing device according to claim 2, wherein
   the adjustment pattern includes a plurality of adjustment patterns,
   the controller is configured to cause the print section to print the plurality of adjustment patterns at different densities,
   the controller is configured to make the shading correction for outputs that the sensor generates by reading the plurality of adjustment patterns, and
   the controller is configured to cause the print section to print the image that has been corrected in accordance with the densities of the adjustment patterns and based on outputs for which the shading correction has been made.

4. The image processing device according to claim 1, wherein
   the patch image is a black patch image printed in the print region at a constant density.

5. The image processing device according to claim 1, wherein
   the shading correction is made to relate a brightness range between the black reference and the white reference to a range between an upper limit and lower limit of brightness output from the sensor.

6. The image processing device according to claim 5, wherein
   the lower limit is determined based on reflectivity of the patch image.

7. The image processing device according to claim 1, wherein
   the sensor includes an area sensor and two or more light sources, the light sources being disposed at different locations.

8. The image processing device according to claim 7, wherein
   no diffuser is provided between the print medium and each of the light sources.

9. A method of generating readout data, the method comprising:
   moving, by a controller in a prescribed direction, a carriage configured to reciprocate at a predetermined, fixed distance from a print medium;
   reading, by the controller using a sensor mounted in the carriage, a print region and a non-print region of the print medium, an image being printed in the print region, the non-print region being a blank area;

setting, by the controller, a patch image printed in the print region to a black reference;

setting, by the controller, the non-print region to a white reference; and making, by the controller, a shading correction for an output from the sensor based on a read result from the sensor, and based on predetermined location-dependent properties of the black reference and the white reference for different locations within the black reference and the white reference to generate the readout data, wherein the different locations within the black reference and the white reference are different in one or both of: the prescribed direction in which the carriage moves and a direction perpendicular to the prescribed direction.

10. The method according to claim 9, wherein
the patch image is a black patch image printed in the print region at a constant density.

11. The method according to claim 9, wherein
the shading correction is made to relate a brightness range between the black reference and the white reference to a range between an upper limit and lower limit of brightness output from the sensor.

12. The method according to claim 11, wherein
the lower limit is determined based on reflectivity of the patch image.

13. The method according to claim 9, wherein
the sensor includes an area sensor and two or more light sources, the light sources being disposed at different locations.

14. The method according to claim 13, wherein
no diffuser is provided between the print medium and each of the light sources.

15. A non-transitory computer-readable medium storing an image processing program that, when executed by a controller, causes the controller to:

move, in a prescribed direction, a carriage configured to reciprocate at a predetermined, fixed distance from a print medium;

cause a sensor mounted in the carriage to read a print region and a non-print region of the print medium, an image being printed in the print region, the non-print region being a blank area;

set a patch image printed in the print region to a black reference;

set the non-print region to a white reference; and make a shading correction for an output from the sensor based on a read result from the sensor, and based on predetermined location-dependent properties of the black reference and the white reference for different locations within the black reference and the white reference, wherein the different locations within the black reference and the white reference are different in one or both of: the prescribed direction in which the carriage moves and a direction perpendicular to the prescribed direction.

16. The non-transitory computer-readable medium according to claim 15, wherein
the patch image is a black patch image printed in the print region at a constant density.

17. The non-transitory computer-readable medium according to claim 15, wherein
the shading correction is made to relate a brightness range between the black reference and the white reference to a range between an upper limit and lower limit of brightness output from the sensor.

18. The non-transitory computer-readable medium according to claim 17, wherein
the lower limit is determined based on reflectivity of the patch image.

19. The non-transitory computer-readable medium according to claim 15, wherein
the sensor includes an area sensor and two or more light sources, the light sources being disposed at different locations.

20. The non-transitory computer-readable medium according to claim 19, wherein
no diffuser is provided between the print medium and each of the light sources.

* * * * *